(12) United States Patent
Santamaria Perez

(10) Patent No.: US 12,059,017 B2
(45) Date of Patent: Aug. 13, 2024

(54) PRODUCTION PROCESS OF NIXTAMALIZED MAIZE FLOUR, NIXTAMALIZING THE MAIZE FRACTIONS SEPARATELY WITHOUT PRODUCING NEJAYOTE

(71) Applicant: Carlos Santamaria Perez, Los Mochis (MX)

(72) Inventor: Carlos Santamaria Perez, Los Mochis (MX)

( * ) Notice: Subject to any disclaimer, the term of this patent is extended or adjusted under 35 U.S.C. 154(b) by 266 days.

(21) Appl. No.: 17/173,939

(22) Filed: Feb. 11, 2021

(65) Prior Publication Data

US 2021/0244052 A1    Aug. 12, 2021

(30) Foreign Application Priority Data

Feb. 12, 2020  (MX) .................. MX/A2020/001704

(51) Int. Cl.
| | | |
|---|---|---|
| A23L 7/10 | (2016.01) | |
| A23P 30/20 | (2016.01) | |
| B02B 3/04 | (2006.01) | |
| B02C 4/44 | (2006.01) | |
| B02C 11/08 | (2006.01) | |

(52) U.S. Cl.
CPC ............. *A23L 7/1975* (2016.08); *A23P 30/20* (2016.08); *B02B 3/04* (2013.01); *B02C 4/44* (2013.01); *B02C 11/08* (2013.01)

(58) Field of Classification Search
CPC .......... A23L 7/1975; A23P 30/20; B02B 3/04; B02C 4/44; B02C 11/08
USPC ....................................................... 426/472
See application file for complete search history.

(56) References Cited

U.S. PATENT DOCUMENTS

| 4,594,260 A | 6/1986 | Vaqueiro et al. |
| 2010/0080881 A1* | 4/2010 | Rubio .................. A23L 7/1975 426/549 |

FOREIGN PATENT DOCUMENTS

| MX | PAa2005006459 | 6/2005 |
| MX | PA05002025 A | 5/2006 |
| MX | PA06002091 A | 8/2006 |
| MX | 2007009645 A | 9/2007 |
| MX | 2008007911 A | 6/2008 |

(Continued)

OTHER PUBLICATIONS

Scheel, C. 2016. Beyond sustainability. Transforming industrial zero-valued residues into increasing economic returns. Journal of Cleaner Production, 131, 376-386.

(Continued)

*Primary Examiner* — Brent T O'Hern
(74) *Attorney, Agent, or Firm* — Calderon Safran & Wright P.C.; Corinne Marie Pouliquen

(57) ABSTRACT

The present invention "Production process of nixtamalized maize flour, nixtamalizing the maize fractions separately without producing nejayote", considers the integration of the processes: Semi-humid milling of the maize (fractionated degerm), extruding of the maize endosperm and milling-instant dehydration of the different nixtamalized and extruded maize fractions, has as novelty the way in which the nixtamalization process is carried out and the objective is to provide a nixtamalized maize flour production system that reduces the residues from the maize grain and completely eliminating nejayote production.

28 Claims, 1 Drawing Sheet

(56) References Cited

FOREIGN PATENT DOCUMENTS

MX      2010012770 A    3/2011
MX      2011002551 A    4/2011

OTHER PUBLICATIONS

CyTA—Journal of Food: Extruded nixtamalized corn flour for making tortilla: the effect of xylanase on the depolymerization of ferulated arabinoxylans—Published May 16, 2013.

* cited by examiner

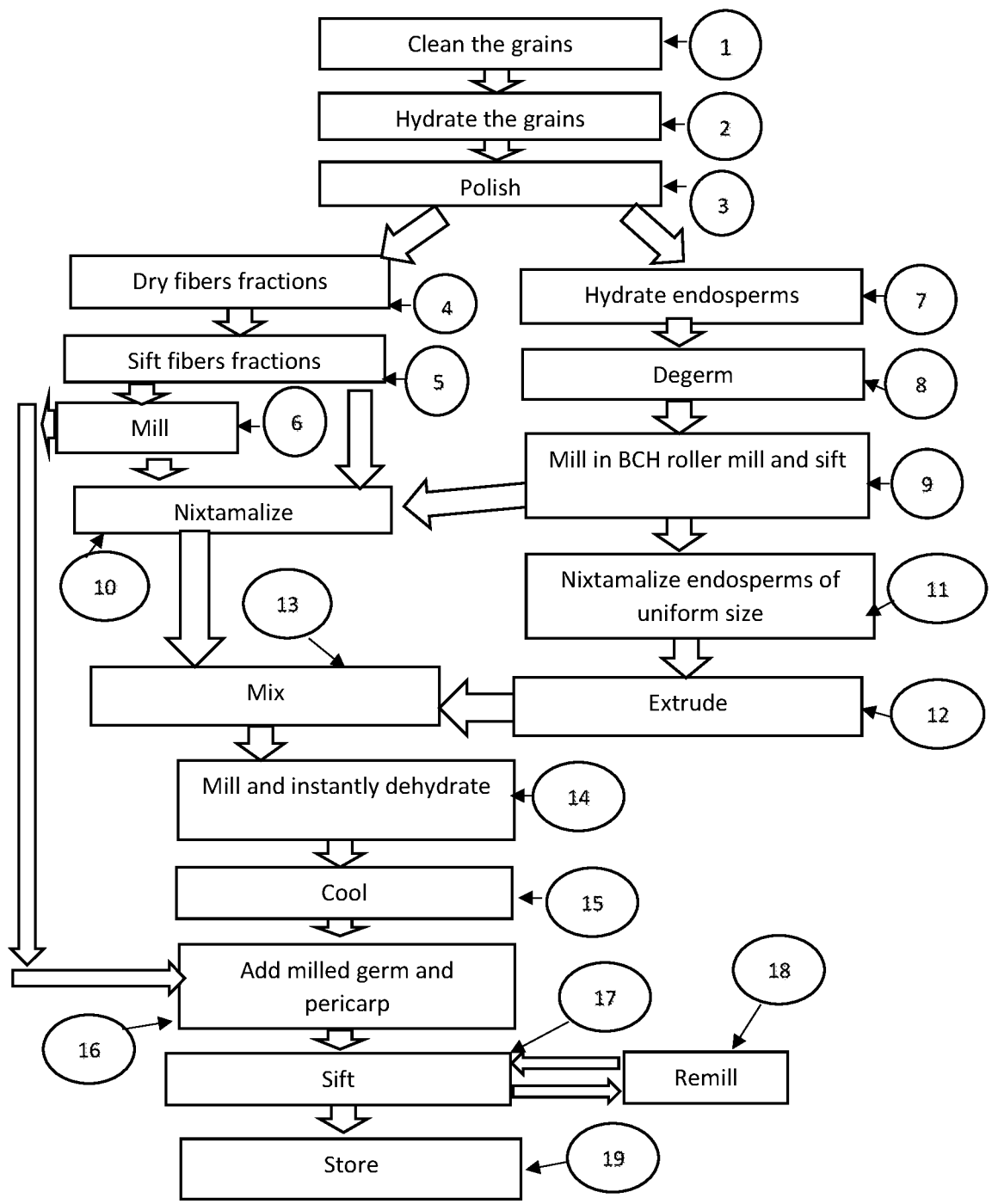

PRODUCTION PROCESS OF NIXTAMALIZED MAIZE FLOUR, NIXTAMALIZING THE MAIZE FRACTIONS SEPARATELY WITHOUT PRODUCING NEJAYOTE

CROSS-REFERENCE TO RELATED APPLICATIONS

This application is related to Patent Application No. MX/A2020/001704 filed Feb. 12, 2020, in Mexico, the disclosure of which is incorporated herein by reference and to which priority is claimed.

BACKGROUND OF THE INVENTION

The production process of nixtamalized flours generates a liquid waste known as nejayote. It's estimated that a tonne of processed maize requires a water volume of three cubic meters, the production of nejayote requires around 50 million cubic meters (Scheel, 2016). If nejayote is left untreated, it can generate environmental pollution due to its high pH and high concentrations of organic matter and calcium hydroxide. Various processes of nixtamalized flour production that reduce or eliminate the production of nejayote are known, these include different configurations of operations which include extrusion, fragmentation of the parts of maize grain.

In that sense, different devices can be cited:

I.—The state of the technique of the patent MXPA05006459 describes the cooking of the pre-milled grain particles in presence of food grade lime and/or hydrochloric acid and water, using the equipment, known as extruder, in which heat can be added using electrical resistances and/or water vapor and/or combustion gases if needed. In this manner, doughs are produced and/or semolina and/or precooked flours that possess chemical and nutritional characteristics similar to their traditionally processed counterparts. The problem of passing the whole grain through the extruder is that it produces flours that, when used in tortillas, yield rigid products. Unlike the present invention which only passes the endosperms through the extruder producing softer products. In addition, the present invention uses the process of milling-instant dehydration, these operations allow control over the cooking and in the flour-dough-tortilla efficiency.

II.—The state of the technique of the patent MX 283057 B describes a process and device for the continuous production of ground nixtamalized and whole maize flour for grain-based foods, that includes pre-condition clean maize, mill the moistened maize to produce fractions of fine and coarse milling, sift the fine milling and vacuum both fractions, one fraction of light maize bran as animal feed, remill the coarse milling for the extraction of additional maize bran and mix the sifted fine milling with food grade lime to yield a milling with food grade lime, precook with low humidity a current of maize particles with food grade lime against a current of saturated vapor to obtain a partial degree of pre-gelatinization of starch and denaturation of protein, ventilate and separate the heated maize particles with low humidity, conditionate the segregated fine milling to soften and inflate the fractions of endosperm, germ and bran, cool the fine milling dried with clean air; mill the agglomerated particles, classify and separate the fine milling yielded by the coarse milling while the last fraction is remilled and sifted to yield a pre-gelatinized flour for tortillas and maize-based foods. The aforementioned patent yields a by-product utilized for animal feed, in the present invention most of the grain is used which represents a technical advantage. The aforementioned patent does not use extrusion or milling-instant dehydration, these operations allow control over the cooking and in the flour-dough-tortilla efficiency.

III.—The state of the technique of the patent application MXPA/a/2005/002025 describes an improved process for obtaining of dough or maize flour, which utilizes a modified system of extrusion that features two extrusion tubes, where the first extruder nixtamalized the maize and the second accelerates the cooling of the mixture, which will prevent the flocculation of the starch. The problem of passing the whole grain through a system of extruders is that it produces flours that, when used in the preparation of tortillas, yield rigid products. Unlike the present invention which only passes the endosperms through the extruder producing softer products, the configuration of the extruder allows for a punctual control of the gelatinization temperature at the extruder outlet. In addition, the present invention uses the process of milling-instant dehydration, these operations allow control over the cooking and in the flour-dough-tortilla efficiency.

IV.—The state of the technique of the patent MX 290668 B describes a process of nixtamalization where the fractions of maize endosperms, sub-fractions or combinations thereof, are nixtamalized individually to yield food products. When nixtamalizing the fractions and using a relation of four to six parts of food grade lime solution to one part of endosperm fraction a big amount of alkaline solution which will have to be treated is being produced. The present invention does not produce basic effluents; therefore, it is more friendly with the environment than the aforementioned patent. In addition, the present invention uses the process of extrusion and milling-instant dehydration, these operations allow control over the cooking and in the flour-dough-tortilla efficiency.

V.—The state of the technique of the patent MX 301668 B describes a process for the production of a flour dough. It utilizes a series of steps of processing that include dry mixing, hydrating, and working the dough or paste in an extruder with a single screw configuration. When mixing the maize grain fractions, adding a gelling agent, and then hydrating them to later on pass them through an extruder as a past, it can generate blockages in the extruder increasing the time of the process. Unlike the aforementioned patent, this invention only uses the hydrated endosperm fraction which passes through the extruder with the configuration that prevents blockages due to its low concentrations of water and fibers such as pericarp. In addition, the present invention uses the process of milling-instant dehydration, these operations allow control over the cooking and in the flour-dough-tortilla efficiency.

VI.—The state of the technique of the patent MX 307096B describes a process and device for the continuous production of whole nixtamalized maize flours, it includes a pre-cook of the whole clean maize with a food grade lime solution to effect a partial hydrolysis of the pericarp and bran with reduced loss of soluble corn in nejayote wastewater. The humidity content is then stabilized, followed then by milling and drying the preconditioned maize for an additional gelatinization of the endosperm in the whole milled grain, later ventilate and separate the dried milled fractions. The aforementioned patent washes cooked maize seeds to eliminate soluble solids and food grade lime excess; therefore, this process yields basic effluents. The proposed invention does not produce basic effluents; therefore, it is more friendly with the environment. In addition, the present invention uses the process of extrusion and milling-instant dehydration, these operations allow control over the cooking and in the flour-dough-tortilla efficiency.

VII.—The state of the technique of the patent application U.S. Pat. No. 4,594,260A describes a selective process of nixtamalization that consists in separating the pericarp from the grain to form a fraction of pericarp and a fraction of endosperm-germ, only subjecting the pericarp fraction to the nixtamalization, heating in an alkaline solution and then mixing the fraction of nixtamalized pericarp with the fraction of untreated endosperm-germ. In the aforementioned patent application, the nixtamalized pericarp is washed by means of a plurality of washing stages, which yields alkaline effluents from the process, unlike the proposed invention which does not yield effluents by washing; therefore, it is less polluting. In addition, the present invention uses the process of extrusion and milling-instant dehydration, these operations allow control over the cooking and in the flour-dough-tortilla efficiency.

VIII.—The state of the technique of the patent MX285780B refers to a process for the production of fresh dough, nixtamalized flour and derived products, which utilizes a series of processing stages that include milling, mixing, hydrating, cooking and continuous cooling to prevent gelatinization. The aforementioned patent includes a mixture with the following fractions of pericarp between approximately 3% to approximately 7% in weight of the maize based mixture and the germ fraction between approximately 1% to approximately 5% in weight of the maize based mixture and it includes a fraction of endosperm between approximately 90% to approximately 93% in weight of the maize based mixture. The difference between the aforementioned patent and the present invention consists in that, with the aforementioned fractions, part of the maize grain is wasted because a maize graine consists between 5% to 6% of pericarp in weight, while the germ is equivalent from 9% to 11% of the weight and the endosperm around 83% of the weight. The proposed invention reduces the residue of the maize grain to a minimum. The aforementioned invention does not use extrusion or milling-instant dehydration, these operations allow control over the cooking and in the flour-dough-tortilla efficiency.

IX.—The state of the technique of the article "Tortillas del maiz azul (*Zea mays* L.) preparadas por un proceso de nixtamalización fraccionado: usando la metodologia de la superficie de respuesta", in this work the pericarp, peduncle, and germ were separated from the endosperm in a pneumatic separator. Afterwards, both fractions were nixtamalized. The fraction of pericarp, peduncle, and germ were nixtamalized with an alkaline solution of boiling water (0.29 at 1.71% of calcium hydroxide) in relation fraction of pericarp, peduncle, and germ: alkaline solution 1:1. Afterwards, the endosperm was cooked in a period of 9.2 to 51.2 minutes. Finally, the dry fractions were milled. In the aforementioned article, a residue of an alkaline solution is formed once the nixtamalization process of the fractions of pericarp, peduncle, and germ is finalized, unlike the present invention which does not yield any residue or alkaline effluent. In addition to the above, another advantage of the proposed invention is that the cooking and nixtamalization of the endosperm is done by an extruder; therefore, there's no generation of a hot water current that later needs to be treated before being taken out of the process. The aforementioned invention does not use extrusion or milling-instant dehydration, these operations allow control over the cooking and in the flour-dough-tortilla efficiency.

X.—The state of the technique of the article "Desarrollo de una harina preparada con base en maiz nixtamalizado por extrusión", in this article they developed a mixture of nixtamalized maize flour with flour from various legumes that were treated through extrusion, for use in the elaboration of cereal based products. The moistening of the maize grain was carried out in a mixer gradually adding water with calcium hydroxide at 0.7% with a sprinkler letting it rest for 24 hours under refrigeration. Afterwards, the nixtamalization took place during the extrusion of this grain. When the whole grain is passed directly through the extruder rigid flours are yielded, unlike the present invention which only passes the endosperms through the extruder, producing soft products. In addition, the present invention uses the process of milling and instant dehydration, these operations allow control over the cooking and in the flour-dough-tortilla efficiency.

XI.—The state of the technique of the thesis "Nixtamalización fraccionada de maiz y su influencia en las propiedades fisicoquímicas de harinas". In this thesis an alternative process was designed for the elaboration of nixtamalized maize flours, through the nixtamalization hydration of the previously fractioned grain in conditions of no saturation of $Ca(OH)_2$ and reduced volumes of water, for the purpose of obtaining flours with characteristics similar to traditional maize flours. The difference between the aforementioned thesis and the present invention lies in the nixtamalization method, since an extruder is used in the proposed invention being more efficient in the process of modification of the starches of the endosperms in less time and with greater energy efficiency, always looking to control of the gelatinization temperature. In addition to the aforementioned, the present invention uses the process of milling and instant dehydration, these operations allow control over the cooking and in the flour-dough-tortilla efficiency.

XII.—The state of the technique of the thesis "Efecto del proceso de nixtamalización sobre el contenido de carotenoides en diferentes hibridos de maiz", in this work the maize was pulverized in a mill and subsequently mixed with food grade calcium hydroxide. Afterwards, distilled water was added to reach 28% percent humidity with a sprinkler. To later be stored at 4° C. for 12 hours. The next step was processing the material in a simple screw extruder with a screw of 19 mm of diameter and 38 cm of length at a feeding speed of 70 g/min. The resulting extrudates were cooled and dried at room temperature and in darkness for 16 hours to then be pulverized in a mill of simple screws to later be milled in another mill to yield particles inferior to 0.5 mm. The aforementioned work completely mills the maize grain to the be mixed with calcium hydroxide, which can lead to an incorrect nixtamalization being that the different parts of the grain (pericarp, endosperm, and germ) require different nixtamalization conditions to yield the suitable properties for flour. In the proposed invention the parts of the grain are given treatment to obtain a better consistency in the flours, a double screw extruder is used with a configuration that allows to control the cooking of the endosperms and the milling-instant dehydration is used to control the flour-dough-tortilla efficiency.

XIII. The state of the technique of the article "Efecto de la xilanasa en el maiz nixtamalizado extruido harina y tortilla: características reológicas y fisicoquimicas". In this article the following process is described: White maize was cleaned in a vibrating cleaner, consequently the maize was milled in a mill with a mesh of 0.8 mm, later on the milled maize was mixed with 0.3% (p/p) of food grade lime in a mixer for five minutes. The xylanase that was previously deluded in deionized water, was immediately added to the mix to reach a final humidity content of 30%. Then the mixture was stored for 12 hours at 5° C. Before the extrusion, each mixture was tempered to 25° C. for four hours. The extrusion was carried out in a single screw extruder, with a screw diameter of 19 mm and a length-diameter relation of 25:1, a relation of nominal compression of 2:1, a die opening of 3 mm and four zones of heating and cooling. The velocity of the screw was 112 rpm, the temperature of the stages was 60, 70, 80 and 90° C. The extrudate was dried in a tunnel drier at 65° C. for an hour, then it was milled in a mill with a 0.8 mm mesh. Unlike the aforementioned article, the proposed invention does not use enzymes to give better properties to the flours and tortillas, by utilizing enzymes the process increases its operation costs. The difference lies in that the present invention separates the parts of the grain and gives them treatments that differ in quantity of calcium hydroxide and added water. In addition to the above, only the endosperms are passed through the extruder, in this manner the starches are modified and yield soft flours. The milling-instant dehydration is also utilized to allow for a better control over the flour-dough-tortilla efficiency.

XIV. The state of the technique of the thesis "Nixtamalización por extrusión de las fracciones del grano de maiz para la obtención de harinas instantáneas" which describes the following process: the grain was subjected to a soaking process for 17 minutes at a water temperature of 40° C., later on the water was eliminated through a runoff of 10 minutes, then they pass through a continuous dehuller at a velocity of 800 rpm. Consequently, the fractions were subjected to a separation process with a pneumatic equipment where the endosperm is separated and on the other side point germ and pericarp. Later, they were subjected to a vacuum oven at 60° C. for 12 hours. Then they were moved to a milling process in a hammer with 0.25 mm circular hole meshes. Consequently, a simple screw extruder was used, the velocity of the extruder was 50 rpm, which had three stages. The specifications of the equipment were an endless screw of 95° C., 6 cm of diameter and a compression relation of 1:1. The output of the extrudate was regulated by a circular matrix of 1.905 cm of diameter where the material was cut to pieces of 2-3 cm of length to facilitate the drying process. Then it was dried in trays at a temperature of 60° C. for 12 hours. After the drying of the sample, they were subjected to a fine milling with a micro pulverizer with a 0.25 mm mesh. If the process of the aforementioned thesis utilizes percentages greater than 15% of point germ and pericarp in the extruding stage, the tortillas do not yield good properties. This problem does not present itself in the proposed invention, since only the endosperms are utilized in the extruding stage in addition to the above, to allow control in the cooking and the milling-instant dehydration is also utilized to allow control in the flour-dough-tortilla efficiency.

BIBLIOGRAPHY

Scheel, C. 2016. Beyond sustainability. Transforming industrial zero-valued residues into increasing economic returns. Journal of Cleaner Production, 131, 376-386.

BRIEF SUMMARY OF THE INVENTION

The production process of nixtamalized maize flour, nixtamalizing the maize fractions separately without producing nejayote, considers the integration of the processes: Semi-humid milling of the maize (fractionated degerm), extruding of the maize endosperm and milling-instant dehydration of the different nixtamalized and extruded maize fractions, is carried out through the following stages: clean the grains (1), hydrate the grains (2), polish (3), dry fibers fractions (4), sift fibers fractions (5), mill (6), hydrate endosperms (7), degerm (8), mill in BCH roller mill and sift (9), nixtamalize (10), nixtamalize endosperms of uniform size (11), extrude (12), mix (13), mill and instantly dehydrate (14), cool (15), add milled germ and pericarp (16), sift (17), remill (18), and store (19). The novelty of this invention lies in the way the nixtamalization process takes place, which is the combination of the steps: j) Nixtamalize the fine flours, milled fibers, and dark flours fractions, k) nixtamalize endosperms of uniform size, and l) extrude. Being that, in the stage of nixtamalize the fine flours, milled fibers, dark flours fractions, and the endosperms hydration of the starches is achieved in presence of food grade lime and, in the stage of extrude, the transformations of the abovementioned starches is completed, which results in properties such as the texture, aroma and flavor of the doughs and tortillas, similar to traditionally nixtamalized doughs. This process does not include nejayote nor alkaline solutions, hydrating only the fine flours, milled fibers, dark flours fractions, and the endosperms, with a calcium hydroxide solution.

BRIEF DESCRIPTION OF THE SEVERAL VIEWS OF THE DRAWING

FIG. 1 shows the flux diagram of the production process of nixtamalized maize flour, nixtamalizing the maize fractions separately without generating nejayote.

DETAILED DESCRIPTION OF THE INVENTION

The production process of nixtamalized maize flour, nixtamalizing the maize fractions separately without generating nejayote is represented in FIG. 1 and includes the following stages:

a) Clean the grains (1): In this stage, the maize grains pass between magnets to eliminate metals, they're then winnowed to eliminate junk (pieces of leaves, lumps of dirt, and branches), consecutively they're vacuumed to eliminate dust, subsequently they're destoned through density difference, finally a color selection is done to the grains to eliminate the grains that do not comply with the color of the flour to be produced. Afterwards the clean maize grains pass to the hydrate the grains stage.

b) Hydrate the grains (2): In this stage, water is spread over the clean grains by spraying and they're continuously mixed to reach a uniform humidity between 14% and 20%, later they are left to rest for a period of one to ten hours to then move to the polish stage.

c) Polish (3): In this stage of the process, the hydrated grains are polished and rested by a degerminator or grain polishing machine which polishes and separates the grain in two parts, the first one that represents between 20% to 35% of the total grain and is composed by fibers, pericarp, parts of the germ, and dark flours which we will call fiber fractions, the second part are the polished grains and endosperms which we will call endosperms and represent between 65% to 80% of the total of the grain, afterwards the fiber fractions will be dried.

d) Dry fibers fractions (4): The fiber fractions are dried with a stream of hot air at a temperature range of 90° C. to 120° C. Afterwards, the fiber fractions are sifted.

e) Sift fibers fractions (5): the dry fiber fraction is sifted to separate the pericarp and germ from the dark flours. The particles left on top of the sieve with a sieve opening range of 0.71 mm (US #25) to 0.85 mm (US #20) are the pericarp and germ, while the dark flours fractions are the ones that pass through. The particles that pass through the mesh pass to the nixtamalize stage and the ones left on top of the mesh pass to the mill stage.

f) Mill (6): The pericarp and germ are milled in a hammer mill and sieve so that 95% of the particles pass through a sieve with a sieve opening of 0.25 mm (US #60). The milled pericarp and germ will be called milled fibers fraction, afterwards the milled fibers can pass to the nixtamalize stage or the add milled germ and pericarp stage. In the event that the milled fibers fraction pass to the nixtamalize stage a 25% to 100% of the milled pericarp and germ will be added. The milled fibers fraction can be also added at the same to the nixtamalize and add milled germ and pericarp stages. While the endosperms of the stage c) pass to the hydrate endosperms stage.

g) Hydrate endosperms (7): In this stage, water is spread over the endosperms by spraying and they're continuously mixed to reach a uniform humidity percentage of 14% to 16%, proceedingly they're left to rest for a maximum time of one hour, once this time has passed they pass to the degerm stage.

h) Degerm (8): The germ and pericarp are separated from the polished hydrated endosperms, that still have it, using a degerminator, forming a mix of flours, germ, and differently sized endosperms. The degerminator utilizes a rotor and a sifting mesh that can be cylindric or conic, the degerm occurs when the polished and hydrated grains are positioned inside the sifting mesh and the rotor moves the sifting mesh, the germ is detached by the friction made between the grain and the sifting mesh, separating the endosperms and the mix of flours and germs. After this stage, the endosperms and the mix of flours and germ pass to the separation of particles by size utilizing BCH roller mills and sift.

i) Mill in BCH roller mill and sift (9): In this stage, the endosperms and the flours and germ mixture are passed through banks of BCH roller mills and sifted to standardize the size of the endosperm and separate the flours and germ mixture. In this stage the endosperms, flours mixture and germ mixture is sifted in two parts, the first are endosperms of uniform size and the second part are flours mixture, endosperms of non-uniform size and germs, this second part will be called fine flours fraction. The endosperms of uniform size have the following granulometric specifications: with a sieve opening of 5.66 mm (US #3.5) a maximum of 3% is retained, with a sieve opening of 4.75 mm (US #4) a minimum of 25% and a maximum of 40% is retained, with a sieve opening of 4 mm (US #5) between 50% to 65% is retained, with a sieve opening of 3.5 mm (US #6) from 2% up to 8% is retained, and with a sieve opening of 3.35 mm (US #6) it's a 1% and has a humidity range of 8% to 12%. While the fine flours have a particles size that goes through a sieve opening of 0.25 mm (US #60) in at least a 95%, later on the endosperms of uniform size pass to the stage of nixtamalize and the fine flours fraction pass to the stage of nixtamalize separately.

j) Nixtamalize (10): The fine flours fractions, the milled fibers fractions and the dark flours are mixed in the following relation: for every 1 gram of fine milled flours, 1 gram of milled fibers fractions and 0.5 grams of dark flours will be added, the humidity range in this mixture is of 6% to 10%, an aqueous solution of calcium hydroxide with 0.1% to 0.15% based on the weight of the milled fibers fractions and dark and fine flours is hydrated by spraying at a temperature of 80° C. to 85° C., the mixture then remains at a temperate range of 40° C. to 45° C. and a continuous mixing is maintained so that the fine flours and milled fibers fractions homogenize with the solution, until reaching a humidity percentage between 25% and 32%, subsequently they're left to rest from one to two hours at a temperature between 40° C. and 45° C., this way the fine flours and milled fibers fractions are nixtamalized. After this step the endosperms of uniform size are passed to the nixtamalize endosperms of uniform size stage.

k) Nixtamalize endosperms of uniform size (11): A solution of calcium hydroxide of 0.1% to 0.15% in weight in relation to the endosperms of uniform size is hydrated by spraying at a temperature range of 80° C. to 85° C., it's then left to rest for a period of two to four hours at a temperature of 40° C. to 45° C. The nixtamalized endosperms of uniform size have a humidity range between 25% to 32% humidity. Afterwards the nixtamalized endosperm of uniform size is extruded.

l) Extrude (12): The nixtamalized endosperm of uniform size is subjected to a doble screw extruder in a range of its capacity between 80 to 90%, at a input material temperature of 40° C. to 50° C. and an output material temperature of 60° C. to 70° C. The extruder has three steps with the following temperatures: from 40° C. to 50° C. in the first zone, from 50° C. to 60° C. in the second zone and from 60° C. to 70° C. in the third zone. With an output hole size in the die of 40% to 70% of the equivalent area of the output section of the extruder. The extrudate of the nixtamalized endosperm of uniform size is cut in small pieces of 0.1 mm to 7 mm, using a four-blade cutter. After the nixtamalized endosperm of uniform size has been extruded and cut it's cooled to temperatures lower than 60° C. The cooling can be carried out by means of a pneumatic process, cooling tunnel or ambient ventilation. The nixtamalized endosperm of uniform size that has been extruded and rapidly cooled will be called extrudate fractions. The humidity of the extrudate fractions is at a range of 25% to 32%. The novelty of this invention lies in the nixtamalization method, which is the combination of the steps described as j) Nixtamalize the fine flours fractions, the milled fibers fractions and the dark flours, k) Nixtamalize the endosperms of uniform size and l) Extrude. Being that, in the stages of nixtamalization of the endosperms, fibers and flours, the hydration of the starches in the presence of food grade lime is achieved and in the stage of extrude the transformation of the same starches is completed, which results in properties such as the texture, aroma and taste of the doughs and tortillas, similar to those of traditional nixtamalization. After this stage the fine flours, dark flours and milled fibers fractions are separately mixed with the extrudate fractions.

m) Mix (13): The extrudate fraction is combined in a 65% to 75% proportion with the mixed nixtamalized flours in a 35% to 25% proportion respectively. The humidity of the mix of mixed nixtamalized flours and extrudate fractions is at a range between 24% to 30%. Once mixed, the fractions pass to the stage of mill and instantly dehydrate.

n) Mill and instantly dehydrate (14): In this stage, the mix is milled in a micro pulverizer mill. Afterwards, it's instantly dehydrated with a flux of warm air and the Venturi effect, at a temperature range between 200° C. and 400° C., this hot air is transported through a in which the diameter is reduced decreasing its pressure and increasing its velocity (Venturi effect), afterwards the section where the diameter is reduced meets a section where the pipe diameter increases and the air expands causing an instant drying of the milled mixture, this effect is known as venturi. Until the milled mixture has a humidity between 7% to 11%. Consecutively the milled dehydrated mixture passes to the cool stage.

o) Cool (15): The cooling is carried out until the milled dehydrated mixture reaches a temperature between 30° C. and 35° C. by means of pneumatic transport using air at room temperature. Afterwards it passes to the sift stage.

p) Add milled germ and pericarp (16): By means of a volumetric dispenser or gravimetric 0% to 75% of the total of the milled germ and pericarp is added. Afterwards it passes to the sift stage.

q) Sift (17): The milled, dehydrated, and cooled mixture is sifted, the sifting yields two fractions: the fine fraction and the coarse fraction. The fine fraction is nixtamalized maize flour and has the following granulometric properties: with a sieve opening of 0.60 mm (US #30) no particle is retained, with a sieve opening of 0.354 mm (US #45) a maximum of 1% is retained, with a sieve opening of 0.250 mm (US #60) a maximum of 15% is retained, with a sieve opening of 0.177 mm (US #80) a maximum of 80% is retained, and with a sieve opening of 0.150 mm (US #100) a maximum of 6% passes through. The color characteristics of the nixtamalized maize flour are the following: dry color from 30% to 100% reflectance and humid color from 20% to 70% reflectance, while the humidity ranges between 6% to 12%, and pH ranges between 5 to 7. The efficiency of the nixtamalized flour refers to the amount of dough that is obtained by adding water to one kilogram of flour. This efficiency ranges from 1.7 kg to 2.5 kg of dough. The sifted material that does not comply with the granulometric properties will be called coarse fraction and is sent to the remill stage.

r) Remill (18): The coarse factions that are separated by the sieve are sent to be remilled in a micro pulverizer mill and afterwards are sent to the sift stage, the nixtamalized flours that comply with the granulometric properties pass to the store stage.

s) Store (19): The flours that are separated by the sieve are sent to be stored in a hopper or/and packaged in different presentations such as sacks (20 kilograms or 22.7 kilograms), super-sacks (500 kilograms or 1000 kilograms), package (1 or 2 kilograms).

Use Cases:

Following the production process of nixtamalized maize flour, nixtamalizing the maize fractions separately without producing nejayote, in the stage a) clean the grains, 1000 kg of white maize grains were cleaned to which metals were removed by passing it through two magnets, afterwards it was winnowed and vacuumed to eliminate junk, coarse and fine impurities. Afterwards, the clean maize grains pass to the stage of hydrate the grains. In a conditioner, the grains are hydrated by spraying water and are continuously mixed to reach a uniform humidity of 14% to 20%, then they are left to rest for at least one hour, to the pass to the stage of polish. The hydrated and rested grains were polished using a polishing-degerminator machine. Two fractions were obtained: 1. Polished grains and endosperms (endosperms), 2. Mixture of pericarp, germ and dark flours (fibers fraction), the fibers fraction is dried in a stream of hot air (temperature of 90° C. to 110° C.) at a maximum of 10% humidity and it's milled in a hammer mill and it's sifted to achieve a granulometry such that 95% of the particles pass through a sieve opening of 0.25 mm. The polished grains and endosperm were hydrated, at this stage water was spread over the polished grains by spraying as they were continuously mixed to achieve a humidity of 14% to 16%. Afterwards, the polished grains and hydrates endosperms were degermed, a polishing-degerminator machine was used. Then the polished grains, endosperms, flours mixture, and germs were separated. To continue with the mill in BCH roller mill and sift stage, in this stage the endosperms of uniform size and flours mixture, and endosperms of non-uniform size and germs were separated, this second part will be called fine flours fraction. The endosperms of uniform size had the following granulometric specification: with a sieve opening of 5.66 mm (US #3.5) a maximum of 3% was retained, with a sieve opening of 4.75 mm (US #4) a minimum of 25% and a maximum of 40% was retained, with a sieve opening of 4 mm (US #5) between 50% to 65% was retained, with a sieve opening of 3.35 mm (US #6) between 2% and 8% was retained, and a maximum of 1% passes through a (US #6) and had a humidity of 11.9%. Then the fibers, pericarp, parts of germ and dark flours were milled using a hammer mill until reaching a granulometry of the following characteristics: with a sieve opening of 0.25 mm a maximum of 3% was retained. After milling the fibers fractions the fine flours, milled fibers, and dark flours were nixtamalized, they were mixed in the following relation: for every 1 gram of milled fine flours, 0.5 grams of dark flours and 1 gram of milled fibers fractions were added, the mixture had a 7.4% of humidity. Consecutively, a solution of calcium hydroxide with 0.1% in weight was hydrated by spraying at a temperature of 80° C. to 85° C., a continuous mix was maintained until reaching a humidity of 26.7%, it was then left to rest one to two hours at a temperature of 40° C. to 45° C. Consecutively, the endosperm of uniform size was nixtamalized, it was hydrated by spraying with a solution of calcium hydroxide of 0.1% at a temperature of 80° C. to 85° C., it was then left to rest for two hours at a temperature of 40° C. to 45° C. The nixtamalized endosperms of uniform size had a humidity of 26.41%. Afterwards, the nixtamalized endosperm of uniform size was extruded in a double screw extruder at 85% capacity at an input temperature of 41° C. and output temperature of 65° C. The extruder had three steps with the following temperatures: 50° C., 60° C., and 70° C. As the extrudate came out of the extruder, it was then cut in small piece of 0.1 mm to 7 mm and it was rapidly cooled by pneumatic conveying using room temperature air. The humidity of the extrudate was 26.16%. Afterwards, the fine flours and milled fibers fractions and the extrudate fractions were mixed in the following manner: the extrudate fraction in a 75% proportion, while the fine flours and milled fibers fractions in a 25% proportion. Once mixed, the humidity of the fine flours and milled fibers fractions and extrudate fractions was 25.6%. The mixture was milled in micro pulverizer mills, it was then instantly dehydrated, with a flow of hot air at a temperature of 300° C. and the air moving according to the Venturi effect. Consecutively, the milled and dehydrated mixture was cooled by means of pneumatic conveying, then the mixture passes to the sifting process where the flour has the following granulometric characteristics: with a sieve opening of 0.60 mm it retained no particles, with a sieve opening of 0.354 mm a maximum of 1% was retained, with a sieve opening of 0.250 mm (US #60) a maximum of 15% was retained, with a mesh of 0.177 mm (US #80) a maximum of 80% was retained, and with a sieve opening of 0.150 mm (US #100) a maximum of 6% passed through. The flour that did not comply with the granulometry was sent to the remill stage and was integrated to the sifting. The color characteristics of the produced flour were the following: dry color of 84% reflectance and humid color of 40%, while the humidity was at 7% and pH at 6.3. The efficiency of the flour to dough obtained adding water to one kilogram of flour was 2.3 kilograms of dough.

Having sufficiently described my invention, I consider it a novelty and therefore I claim as my exclusive property the content of the following clauses:

1. Process of nixtamalized maize flour production by nixtamalizing maize fractions separately without producing nejayote, comprising the following steps:
 a) cleaning maize grains by passing the maize grains between magnets, winnowing, vacuuming, destoning, and selecting a color to obtain clean maize grains;
 b) hydrating the clean maize grains by spraying water over the clean maize grains and continuously mixing to obtain hydrated maize grains;
 c) polishing and resting the hydrated maize grains to obtain polished and rested maize grains and separating the polished and rested maize grains into two parts, a first part being a fiber fraction composed of fibers, pericarp, parts of germ, and dark flour, and a second part being an endosperm fraction composed of polished grains and endosperms:
 d) drying the fiber fraction with a stream of hot air at a temperature range of 90° C. to 120° C. to obtain a dry fiber fraction;
 e) sifting the dry fiber fraction to separate the pericarp and the parts of germ from the dark flour with a first sieve with an opening range of 0.71 mm to 0.85 mm to obtain sifted dark flour that has passed through the first sieve and a retained fraction containing the pericarp and the parts of germ that is left in the first sieve;
 f) milling the retained fraction in a hammer mill and sifting through a second sieve so that 95% by weight of the pericarp and the parts of germ contained in the retained fraction pass through the second sieve with a second sieve opening of 0.25 mm to obtain milled fibers;
 g) spraying water over the endosperm fraction, continuously mixing, and then resting for a maximum time of one hour obtain a hydrated endosperm fraction;
 h) separating any of the parts of germ and the pericarp remaining in the hydrated endosperm fraction using a degerminator to obtain an endosperm mixture comprising a mix of flour, the parts of germ, and differently sized endosperms;
 i) passing the endosperm mixture through banks of a double grain roller mill, and sifting into two parts wherein a first comprises endosperms of uniform size and a second is a fine flour fraction comprising a flour mixture, endosperms of non-uniform size and germ;
 j) mixing the fine flour fraction, the milled fibers and the sifted dark flour to obtain a dry mixture, and hydrating the dry mixture by spraying an aqueous solution of calcium hydroxide with 0.1% to 0.15% by weight of the dry mixture at a temperature of 80° C. to 85° C., maintaining at a temperate range of 40° C. to 45° C. and mixing continuously until reaching a humidity between 25% and 32%, and resting from one to two hours at a temperature between 40° C. and 45° C. to obtain mixed nixtamalized flour;
 k) hydrating the endosperms of uniform size in a solution of calcium hydroxide of 0.1% to 0.15% by weight in relation to the endosperms of uniform size by spraying at a temperature range of 80° C. to 85° C., and resting for a period of two to four hours at a temperature of 40° C. to 45° C. to obtain nixtamalized endosperm of uniform size;
 l. Subjecting the nixtamalized endosperm of uniform size to a double screw extruder to between 80 to 90% of a capacity of the double screw extruder, at an input temperature of 40° C. to 50° C. and an output temperature of 60° C. to 70° C., cutting and cooling to temperatures lower than 60° C. to obtain extruded fractions;
 m) combining the extruded fractions in a proportion of 65% to 75% by weight with the mixed nixtamalized flour in a proportion of 35% to 25% by weight to obtain a mix;
 n) milling the mix in a micro pulverizer mill to obtain a milled mix, dehydrating the milled mix with a flux of warm air from a pipe with an initial reduced diameter section and a subsequent increased diameter section wherein when the milled mix meets the subsequent increased diameter section, the air expands causing instant drying of the milled mix to obtain a milled dehydrated mixture;
 o) cooling the milled dehydrated mixture until the milled dehydrated mixture reaches a temperature between 30° C. and 35° C. to obtain a milled, dehydrated, and cooled mixture;
 p) sifting the milled, dehydrated, and cooled mixture to yield a fine fraction comprising nixtamalized maize flour and a coarse fraction;
 q) re-milling the coarse fraction in a micro pulverizer mill and sifting to separate flour that meets granulometric properties to obtain a sieved flour; and
 r) sending the sieved flour and the nixtamalized maize flour to be stored in a hopper or/and packaged in different presentations.

2. The production process of nixtamalized maize flour according to claim 1, wherein the step b) comprises spreading water over the clean maize grains to reach a uniform humidity between 14% and 20%.

3. The production process of nixtamalized maize flour according to claim 1, wherein the step c) comprises polishing the hydrated maize grains with a grain polishing machine and resting for a period of time between one and ten hours.

4. The production process of nixtamalized maize flour according to claim 1, wherein in the step c) the first part comprises between 20% to 35% by weight of the polished and rested maize grains and the second part comprises between 65% and 80% by weight of the polished and rested maize grains.

5. The production process of nixtamalized maize flour according to claim 1, wherein the step c) comprises polishing with a degerminator or a grain polishing machine.

6. The production process of nixtamalized maize flour according to claim 1, comprising skipping the step e) and passing the dry fiber fraction directly to the step f).

7. The production process of nixtamalized maize flour according to claim 1, wherein the step f) comprises adding 0% to 75% by weight of the milled fibers to a volumetric or gravimetric dispenser to obtain a portion of milled fiber and passing the portion of milled fiber to the step p).

8. The production process of nixtamalized maize flour according to claim 1, wherein the step f) comprises passing 25% to 100% by weight of the milled fibers to the step j).

9. The production process of nixtamalized maize flour according to claim 1, wherein the milled fibers comprise a first portion and a second portion and concurrently adding the first portion to the step j), and the second portion to the step p).

10. The production process of nixtamalized maize flour according to claim 1, wherein in the step g), water is sprayed over the endosperm fraction to reach a humidity of 14% to 16%.

11. The production process of nixtamalized maize flour according to claim 1, wherein in the step h), the degerminator comprises a sifting mesh that is cylindric or conic.

12. The production process of nixtamalized maize flour according to claim 1 wherein in the step i), the endosperms of uniform size comply with the following granulometric specifications: with a sieve opening of 5.66 mm a maximum of 3% by weight is retained, with a sieve opening of 4.75 mm between 25% to 40% by weight is retained, with a sieve opening of 4 mm between 50% to 65% by weight is retained, with a sieve opening of 3.5 mm between 2% to 8% by weight is retained, and with a sieve opening of 3.35 mm a maximum of 1% by weight is retained, and has a humidity range of 8% to 12%.

13. The production process of nixtamalized maize flour according to claim 1, wherein in the step i), the fine flour fraction has a particle size wherein at least 95% by weight passes through a sieve opening of 0.25 mm in.

14. The production process of nixtamalized maize flour according to claim 1, wherein in the step j), the fine flour fraction, the milled fibers, and the sifted dark flour are mixed in the following amounts: for every 1 gram of the fine flour fraction, 1 gram of the milled fibers and 0.5 grams of the sifted dark flour are added, with a humidity range in the dry mixture between 6% to 10%.

15. The production process of nixtamalized maize flour according to claim 1, wherein in the step k), the endosperms of uniform size have a humidity range of 25% to 32%.

16. The production process of nixtamalized maize flour according to claim 1, wherein in the step l), the extruder has three temperature zones: from 40° C. to 50° C. in a first zone, from 50° C. to 60° C. in a second zone, and from 60° C. to 70° C. in a third zone, an output section, and an output hole size of 40% to 70% of the equivalent area of the output section of the extruder.

17. The production process of nixtamalized maize flour according to claim 1, wherein in the step l), the humidity of the extruded fractions is in a range of 25% to 32%.

18. The production process of nixtamalized maize flour according to claim 1, wherein in the step l), the nixtamalized endosperm of uniform size that is extruded is cut into small pieces of 0.1 mm to 7 mm using a four-blade cutter.

19. The production process of nixtamalized maize flour according to claim 1, wherein in the step l), the nixtamalized endosperm of uniform size that is extruded is cooled with a pneumatic process, cooling tunnel or ambient ventilation.

20. The production process of nixtamalized maize flour-according to claim 1, wherein in the step m), the humidity of the mix is in a range between 24% to 30%.

21. The production process of nixtamalized maize flour according to claim 1, wherein in the step n), the milled mixture is dehydrated with a flux of warm air at a temperature range between 200° C. and 400° C.

22. The production process of nixtamalized maize flour-according to claim 1, wherein in the step n), the milled mixture is dehydrated with a flux of warm air until reaching a humidity range of 7% to 11%.

23. The production process of nixtamalized maize flour according to claim 1, wherein in step the p), the milled, dehydrated, and cooled mixture is sifted, and has the following granulometric properties: with a sieve opening of 0.60 mm no particle is retained, with a sieve opening of 0.354 mm a maximum of 1% by weight is retained, with a sieve opening of 0.250 mm a maximum of 15% by weight is retained, with a sieve opening of 0.177 mm a maximum of 80% by weight is retained, and with a sieve opening of 0.150 mm a maximum of 6% by weight passes through.

24. The production process of nixtamalized maize flour according to claim 1, wherein in the step p), the nixtamalized maize flour has the following characteristics: dry color with from 30% to 100% reflectance, humid color with from 20% to 70% reflectance, humidity between 6% to 12%, and pH between 5 to 7.

25. The production process of nixtamalized maize flour according to claim 1, wherein in the step p), one kilogram of the nixtamalized maize flour produces 1.7 kg to 2.5 kg of dough-when mixed with water.

26. The production process of nixtamalized maize flour according to claim 1, wherein in the step r), the sacks weigh 20 kg or 22.7 kg.

27. The production process of nixtamalized maize flour according to claim 1, wherein in the step r), the sacks weigh 500 kg or 1000 kg.

28. The production process of nixtamalized maize flour according to claim 1, wherein in the step r), the sacks weigh 1 kg or 2 kg.

* * * * *